US008287417B2

(12) United States Patent
Sudou et al.

(10) Patent No.: US 8,287,417 B2
(45) Date of Patent: Oct. 16, 2012

(54) DIFFERENTIAL DEVICE FOR VEHICLE

(75) Inventors: Noriyuki Sudou, Kanuma (JP);
Toshiaki Komatsu, Kitaibaraki (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 650 days.

(21) Appl. No.: 11/825,020

(22) Filed: Jul. 3, 2007

(65) Prior Publication Data
US 2008/0009381 A1 Jan. 10, 2008

(30) Foreign Application Priority Data
Jul. 6, 2006 (JP) .................................. 2006-187232

(51) Int. Cl.
*F16H 48/20* (2012.01)
(52) U.S. Cl. ...................................................... 475/231
(58) Field of Classification Search ............... 475/231, 475/240, 241
See application file for complete search history.

(56) References Cited

U.S. PATENT DOCUMENTS

| 4,781,079 A * | 11/1988 | Takahashi | 475/240 |
| 6,478,708 B2 * | 11/2002 | Krisher | 475/150 |
| 2007/0142157 A1 * | 6/2007 | Nofzinger et al. | 475/231 |

FOREIGN PATENT DOCUMENTS

| JP | 2002-364729 | 12/2002 |
| JP | 2004-100924 | 4/2004 |
| JP | 2005-106281 | 4/2005 |

* cited by examiner

*Primary Examiner* — David D Le
*Assistant Examiner* — Erin D Bishop
(74) *Attorney, Agent, or Firm* — Morrison & Foerster LLP

(57) ABSTRACT

A differential device for a vehicle includes a differential casing 15, pinion shafts 25, 27 connected to through-holes of the differential casing 15, pinion gears 3 supported by the pinion shafts 25, 27, a differential mechanism 9 having side gears 5, 7 meshing with the pinion gears 3, a limited-slip differential 11 for limiting a differential rotation of the differential mechanism 9 and an actuator 13 for controlling the limited-slip differential 11. A ring gear is fixed on a flange part 17 of the differential casing 15. The flange part 17 is positioned on one side of the differential casing 15 in an axial direction of the differential casing disproportionately. The actuator 13 is arranged so as to abut on the flange part 17. The differential casing 15 is divided into casing pieces by a parting part 19 on one side of the differential casing 15 in opposition to the flange part 17 in the axial direction. The casing pieces are connected with each other by connecting members 21.

10 Claims, 10 Drawing Sheets

US 8,287,417 B2

DIFFERENTIAL DEVICE FOR VEHICLE

BACKGROUND OF THE INVENTION

1. Field of the Invention

The present invention relates to a differential device for a vehicle.

2. Description of the Related Art

In prior art, Japanese Patent Laid-open Publication No. 2002-364729 (referred to as "Patent Document No. 1, hereinafter) discloses a differential device. The differential device includes an outer differential casing into which driving torque of a motor is inputted through a ring gear fixed to a flange part of the outer differential casing, an inner differential casing arranged so as to be rotatable in relation to the outer differential casing, a bevel-gear type differential mechanism connected to the inner differential casing, an intermittent mechanism for intermitting the driving torque between the inner differential casing and the outer differential casing and an actuator for operating the intermittent mechanism. Note that the outer differential casing is divided into two pieces on the border of the flange part in order to assemble built-in components into the casing. The actuator is arranged on one side of the outer differential casing in opposition to the flange part in the axial direction of the outer differential casing. This publication will be referred to as "Patent Document No. 1", hereinafter.

Japanese Patent Laid-open Publication No. 2004-100924 (referred to as "Patent Document No. 2", hereinafter) discloses an electromagnetic actuator, and a differential device and a power interrupting device both adopting the electromagnetic actuator. In the publication, the differential device includes a differential casing into which driving torque of a motor is inputted through a ring gear fixed to a flange part of the differential casing, a bevel-gear type differential mechanism connected to the differential casing and an actuator for operating the differential mechanism. The differential casing is divided into two pieces on the border of the flange part in order to assemble built-in components into the casing. The actuator is arranged on one side of the differential casing in opposition to the flange part in the axial direction of the differential casing.

Japanese Patent Laid-open Publication No. 2005-106281 (referred to as "Patent Document No. 3", hereinafter) discloses a differential system and a method of switching the operational mode of the system. This differential system includes a differential casing into which driving torque of a motor is inputted through a ring gear fixed to a flange part of the differential casing, a differential mechanism into which the driving torque is inputted from the differential casing, a differential lock mechanism and an actuator for operating the differential locking mechanism. The differential casing is divided into two pieces on the border of the flange part in order to assemble built-in components into the casing. The actuator is arranged on the same side as the flange part in the axial direction of the differential casing.

SUMMARY OF THE INVENTION

In common with Patent Document Nos. 1 and 2, the flange part is formed with a thin-walled thickness since the outer differential casing (or the differential casing in Patent Document No. 2) is divided into two pieces on the border of the flange part. Therefore, if increasing the wall thickness of the flange part in view of enhancing its strength, the outer differential casing (the differential casing) increases in size and weight and additionally, it becomes difficult to arrange the actuator on the same side as the flange part.

Furthermore, in common with these differential devices, the actuator is arranged on one side of the differential casing in opposition to the flange part on the other side of the differential casing. Therefore, it is necessary to broaden an interval between a boss part of the differential casing for supporting the actuator and respective shaft centers of pinion shafts for carrying pinion gears (necessity of adopting of the offset arrangement of the pinion shafts). However, if the interval is broadened excessively, there may be produced an inconformity between dimensional requirements for output shafts (drive shafts) spline-connected to side gears and the so-broadened interval, causing an impossibility of mounting the differential device on a vehicle since the broadened interval has an influence on the arrangement of other components in the circumference of the differential device.

In the differential system of Patent Document No. 3, by adopting an arrangement where the actuator is arranged in the vicinity of the flange part of the differential casing, it becomes easy to allow the interval between the boss part of the differential casing and the shaft centers of the pinion shafts to conform the above dimensional requirements for output shafts (drive shafts) connected to the side gears. However, since the differential casing is divided into two components on the border of the flange part, there exit the above-mentioned problems in common with Patent Documents Nos. 1 and 2.

Under a situation mentioned above, an object of the present invention is to provide a differential device capable of avoiding an increase in size of the differential device while improving its entire strength with an adoption of the arrangement where the actuator is arranged in the vicinity of the flange part of the differential casing.

According to the present invention, there is provided a differential device for a vehicle, comprising a differential mechanism including an input member which is rotatable by a driving torque inputted, differential members to which the driving torque is transmitted from the input member, a pair of output members connected to the differential members so as to be rotatable relatively to the differential members, wherein the differential mechanism being rotatable coaxially with the input member, and either a limited-slip differential for limiting a differential rotation of the differential mechanism or an intermittent unit for intermitting the driving torque, wherein the limited-slip differential or the intermittent unit includes an actuator for controlling a limited-slip differential force or an intermittent function, the input member includes a cylindrical differential casing accommodating the differential mechanism, the differential casing including a flange part to which a ring gear for inputting the driving torque is fixed, the flange part is positioned on one side of the differential casing in an axial direction thereof disproportionately, the actuator is arranged so as to abut on the flange part, and the differential casing is divided into casing pieces by a parting part on another side of the differential casing in opposition to the flange part in the axial direction of the differential casing, the casing pieces being connected with each other by connecting members.

DETAILED DESCRIPTION OF THE PREFERRED EMBODIMENTS

Embodiment of the present invention will be described with reference to accompanying drawing, in detail.

$1^{st}$. Embodiment

Figure 1:
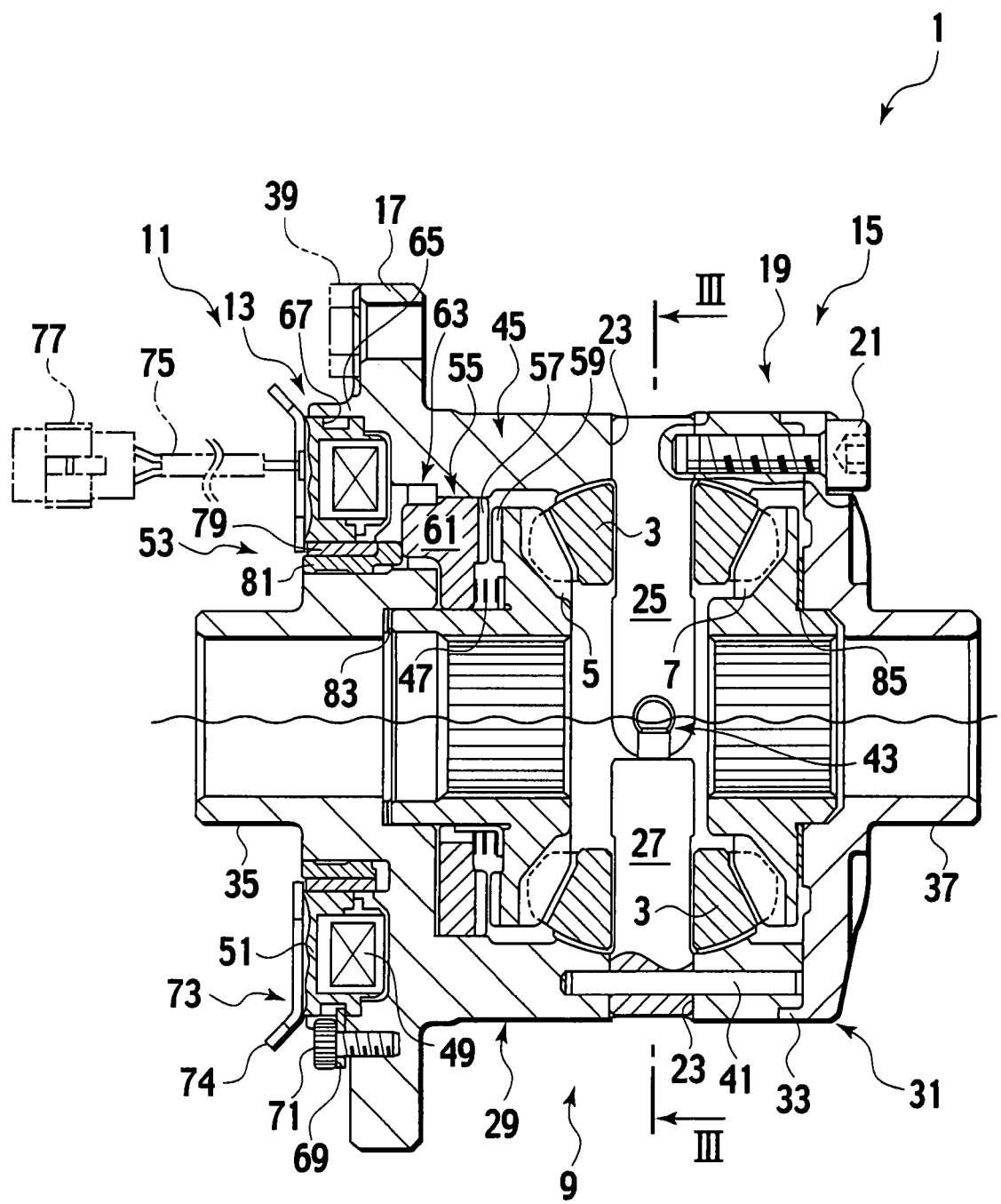
FIG. 1 is a sectional view showing a rear differential in accordance with a first embodiment of the present invention.
Figure 2:
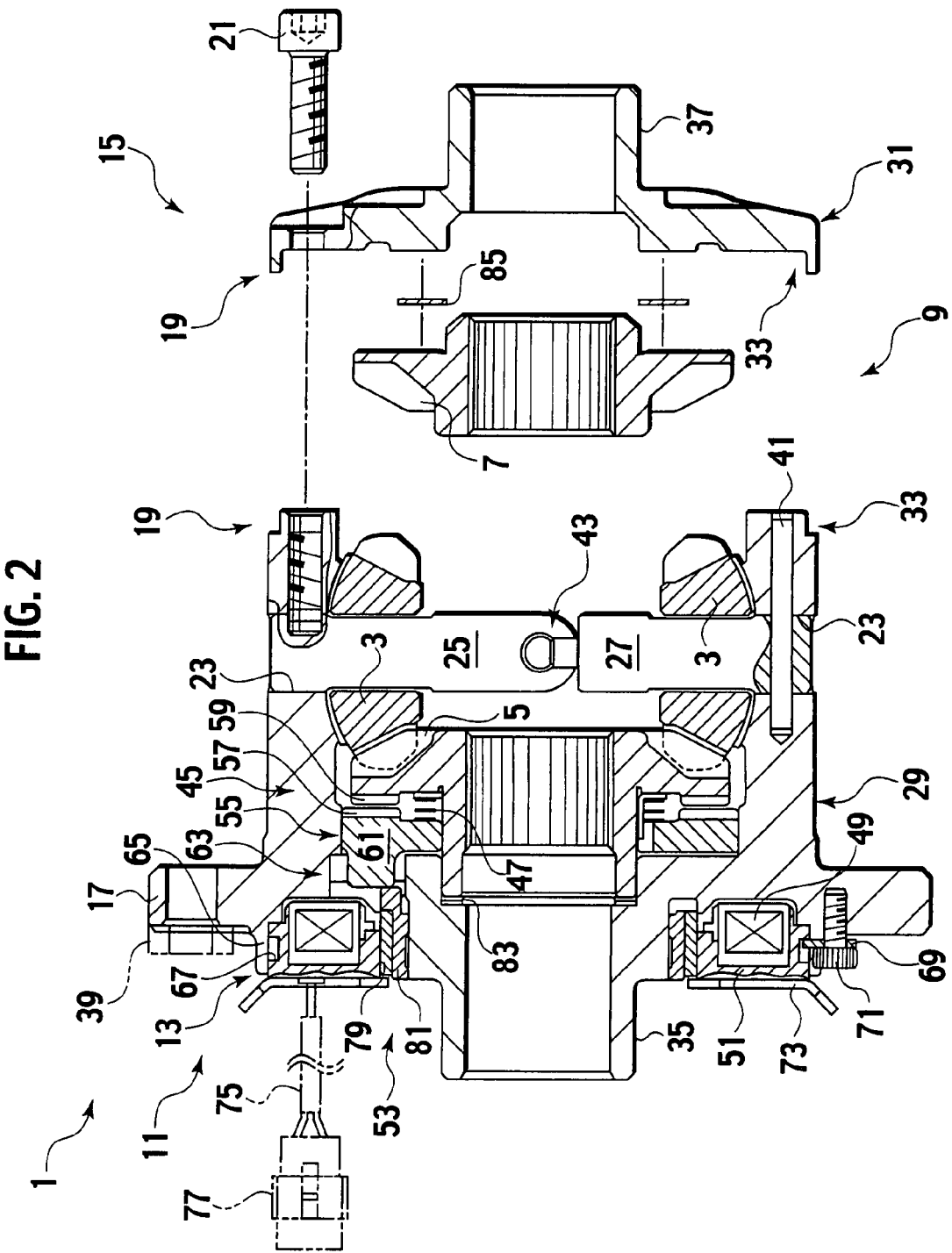
FIG. 2 is an exploded view of the rear differential.
Figure 3:
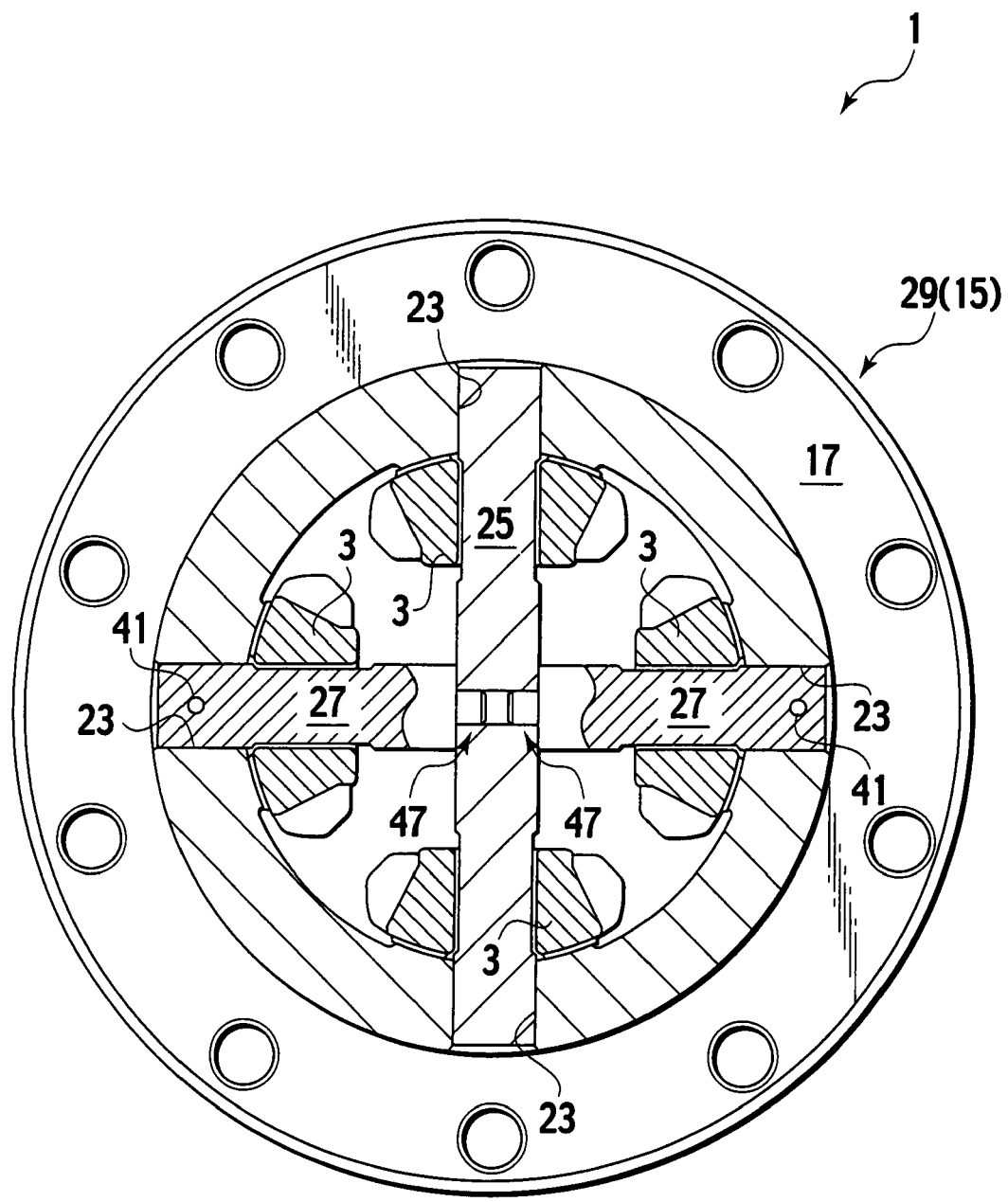
FIG. 3 is a sectional view taken along a line III-III of FIG. 1.

Referring to FIGS. 1 to 3, we now explain a differential device in accordance with a first embodiment of the present invention. This differential device is embodied in the form of a rear differential 1 shown in FIGS. 1 to 3. In the following descriptions, "left direction" and "right direction" coincide with left and right directions in both a four-wheel drive vehicle provided with the rear differential 1 and FIG. 1, respectively.

[Feature of the Rear Differential 1]

The rear differential 1 includes an input member rotated on receipt of the driving torque, four pinion gears 3 (as differential members, see FIG. 3) to which the driving torque is transmitted from the input member and a pair of side gears 5, 7 (as output gears in pairs) associated with the pinion gears 3 so as to be rotatable relatively to the pinion gears 3. The rear differential 1 further includes a differential mechanism 9 which is rotatable coaxially with the input member and a differential locking unit 11 (as a limited-slip differential) for limiting a differential rotation of the differential mechanism 9. The differential locking unit 11 contains an electromagnetic actuator 13 for controlling a slip limiting force. The input member contains a cylindrical differential casing 15 for accommodating the differential mechanism 9. The differential casing 15 contains a flange part 17 fixing a ring gear for inputting the driving torque. The flange part 17 is positioned on one side of the differential casing 15 in the axial direction of the rear differential 1 disproportionately (i.e. in so-called "offset" arrangement). The electromagnetic actuator 13 is arranged so as to abut on the flange part 17.

The differential casing 15 is divided into casing pieces on the border of a parting part 19 on one side of the casing 15 in opposition to the flange part 17 in the axial direction of the differential casing 15. These casing pieces are connected with each other into one body by bolts 21 (as connecting members).

The differential mechanism 9 includes one long pinion shaft 25 and two short pinion shafts 27 all connected to the differential casing 15 through through-holes 23 (as connecting parts). The pinion gears 3 are supported by the pinion shafts 25, 27. In the differential casing 15, the parting part 19 is arranged on one side of the through-holes 23 in opposition to the flange part 17.

[Constitution of Four-wheel Drive Vehicle]

Assume, the above four-wheel drive vehicle is traveling under a four-wheel driving condition. Then, when the rear differential 1 is coupled to a two-wheel/four-wheel switching mechanism built in a transfer, the driving torque of an engine is allocated to a torque on a front-wheel side and a torque on a rear-wheel side through the transfer. The torque on the front-wheel side is allocated to left and right front wheels through a front differential, while the torque on the rear-wheel side is allocated to left and right rear wheels through a propeller shaft and the rear differential 1.

On the other hand, when the coupling state between the rear differential 1 and the two-wheel/four-wheel switching mechanism is cancelled, the vehicle is brought into a two-wheel driving condition.

[Constitution of Rear Differential 1]

The rear differential 1 is accommodated in a differential carrier and formed by the differential mechanism 9, the differential locking unit 11, the differential casing 15 and so on.

The differential casing 15 is divided into a differential casing body 29 and an end cover 31 on the border of the parting part 19. There casing pieces (the differential casing body 29, the end cover 21) are engaged with each other through a counter-lock type connecting part 33 provided in the parting part 19 to allow a centering of the casing pieces. Additionally, their casing pieces are fixed to each other by the bolts 21. The bolts 21 are arranged in circumferential intervals between the pinion shaft 25 and the pinion shafts 27, two bolts for each interval and eight bolts in total. The differential casing body 29 is formed with a boss part 35 supported by the differential carrier through a bearing. Similarly, the end cover 31 is formed with a boss part 37 supported by the differential carrier through a bearing. The flange part 17 is formed in the differential casing body 29. The ring gear is fixed on the flange part 17 by bolts 39 (only one shown in the figure).

In the differential mechanism 9, the side gears 5, 7 meshes with each pinion gear 3, on both sides of the gear 3. These side gears 5, 7 are connected to left and right rear wheels through output shafts (not shown). The output shafts are spline-connected to the side gears 5, 7, respectively. As shown in FIG. 3, the short pinion shafts 27, 27 are inserted into the through-holes 23 through their outer ends in the radial direction. The pinion shafts 27, 27 are prevented from dropping out of the through-holes 23 by spring pins 41. In the short pinion shafts 27, 27, their inner ends in the radial direction are connected to the long pinion shaft 25 by a joint part 43. Respective outer ends of the pinion shaft 25 in the radial direction are inserted into the through-holes 23. The pinion shaft 25 is prevented from dropping out of the through-hoes 23 by the connected pinion shafts 27, 27.

The differential locking unit 11 comprises the electromagnetic actuator 13, a dog clutch 45, a return spring 47, a controller and so on. The electromagnetic actuator 13 includes an electromagnetic solenoid 49, a coil housing 51 containing the electromagnetic solenoid 49 and a plunger 53.

The dog clutch 45 has meshing gears 57, 59 respectively formed on a clutch ring 55 and the left side gear 5 to oppose each other in the axial direction. The clutch ring 55 is arranged on one side of the electromagnetic actuator 13. Inside the differential casing 15 (the differential casing body 19), the clutch ring 55 is carried so as to movable in the axial direction. In the clutch ring 55, its leg part 61 is engaged in a through-hole 63 of the differential casing 15, preventing the clutch ring 55 from rotating. When the clutch ring 55 moves to the right, the dog clutch 45 is brought into its engagement state. When the clutch ring 55 moves to the left as shown in FIG. 1, the engagement of the dog clutch 45 is cancelled. The return spring 47 is arranged between the side gear 5 (the meshing gear 59) and the clutch ring 55 (the meshing gear 57) to urge the clutch ring 55 in a direction to cancel the engagement of the dog clutch 45 (to the left).

In the electromagnetic solenoid 49, the coil housing 51 is supported by an annular supporting part 65 of the differential casing 15 in the radial direction. The coil housing 51 is provided, on its outer circumferential part, with a circumferential groove 67 in which a plate 69 is engaged. The plate 69 is fixed to the differential casing 15 by a bolt 71, making it impossible for the coil housing 51 to move relatively to the plate 69 in the axial direction. A whirl-stop member 73 is fixed to the coil housing 51. In the whirl-stop member 73, its leading end 74 is engaged with the differential carrier, preventing the coil housing 51 from rotating. The electromagnetic solenoid 49 has a lead wire 75 extracted from the coil housing 51 through a rubber seal plug. The so-extracted lead wire 75 is fixed on a side wall of the coil housing 51 by means of clips. The lead wire 75 is further extracted outside the differential carrier through the intermediary of a connector 77 and connected to a battery (not shown).

The plunger 53 is formed by a plunger body 79 made of magnetic material, such as JIS-S10C, and a guide member 81 made of non-magnetic material, such as stainless steel, and also fixed to the inner circumference of the plunger body 79. On the outer circumference of the left boss part 35 (the differential casing body 29), the guide member 81 is supported so as to be movable in the axial direction. In the guide member 81, its leasing end is capable of pushing the leg part 61 of the clutch ring 55 through the through-hole 63.

The coil housing 51 made of magnetic material (e.g. JIS-S10C), the plunger 53 and the differential casing 15 constitute a magnetic path of the electromagnetic solenoid 49. The controller has charge of both excitation and non-excitation of the electromagnetic solenoid 49. When the electromagnetic solenoid 49 is excited, the plunger 53 is moved to the right and the clutch ring 55 is pressed to activate the dog clutch 45 in engagement, so that a differential motion of the differential mechanism 9 (the rear differential 1) is locked on. When the excitation of the electromagnetic solenoid 49 is stopped, the plunger 53 returns to the left by the return spring 47, so that the engagement at the dog clutch 45 and the locked differential motion are cancelled, as shown in FIG. 1. The non-magnetic guide member 81 prevents magnetic flux of the electromagnetic solenoid 49 from leaking out toward the differential casing 15. As mentioned before, the coil housing 51 of the electromagnetic solenoid 49 abuts on the supporting part 65 of the differential casing 15 in the radial direction of the rear differential 1, while the coil housing 51 is supported by the plate 69 and the bolt 71 in the axial direction of the rear differential 1. In other words, the electromagnetic solenoid 49 of the actuator 13 is arranged so as to abut on the differential casing 15 in both a radial direction and the axial direction of the differential casing 15. Therefore, with the stable supporting form, there is little fluctuation in flux transmitted through the differential casing 15, so that the operational function of the dog clutch 45 can be stabilized.

While the differential mechanism 9 is transmitting the driving torque, a gearing clutch action (dog clutch) is produced between each of the side gears 5, 7 and each of the pinion gears 3. As a result, a meshing reactive force of the left side gear 5 is transmitted to the differential casing 29 through a thrust washer 83, while a meshing reactive force of the right side gear 7 is transmitted to the end cover 31 through a thrust washer 85. Note that only the meshing reactive force of the right side gear 7 is applied on the bolts 21 fixing the differential casing body 29 with the end cover 31.

In the dog clutch 45, there are produced meshing reactive forces due to the cam action of the meshing gears 57, 59. The meshing reactive force on the side of the clutch ring 55 (i.e. the meshing gear 57) is transmitted to the differential casing body 29, while the meshing reactive force on the side of the left side gear 5 (i.e. the meshing gear 59) is transmitted to the through-holes 23 in the differential casing body 29 through the pinion gears 3 and the pinion shafts 25, 27. That is, since both of the meshing reactive forces are canceled each other inside the differential casing body 29, there is no burden on the bolts 21.

In assembling, as shown in FIG. 2, it is firstly performed to assemble a sub-assembly where the clutch ring 55, the return spring 47, the thrust washer 83, the left side gear 5, the pinion shafts 25, 27, the pinion gears 3 and the electromagnetic actuator 13 (the electromagnetic solenoid 49, the coil housing 51, the plunger 53) are built into the differential casing body 29. Next, the right side gear 7 and the thrust washer 85 are assembled into the above sub-assembly and successively, the end cover 31 is fixed to the differential casing body 29 by the bolts 21. In this way, the rear differential 1 is completed.

[Effect of Rear Differential 1]

The rear differential 1 constructed in the above way has the following effects.

As the differential casing 15 is divided into the differential casing body 29 and the end cover 31 on the border of the parting part 19 on one side of the differential casing 15 in opposition to the flange part 17 in the axial direction of the rear differential 1, there can be prevented the following undesirable tendencies: thin-walled formation of the flange part 17 accompanied with the division of the differential casing 15 on the border of the flange part 17; and increasing in both size and weight of the differential casing 15 accompanied with a thick-walled flange part 17 in view of improving the strength.

Additionally, as the flange part 17 is not formed with a thick-walled structure, a layout to arrange the electromagnetic actuator 13 in the vicinity of the flange part 17 can be established with ease. Further, with the above arrangement of the electromagnetic actuator 13, it becomes easy to allow intervals between the boss parts 35, 37 of the differential casing 15 and the axial centers of the pinion shafts 25, 27 to correspond to required dimensions of the output shafts (drive shafts) on the side of the side gears 5, 7, whereby the layout capability in the circumference of the rear differential 1 and its mounting capability on a vehicle can be improved together.

Again, since the electromagnetic actuator 13 is arranged so as to abut on the flange part 17 of the differential casing 15, the dog clutch 45 forming the differential locking unit 11 can be arranged in the vicinity of the flange part 17. Correspondingly, as the through-hole 63 for receiving a part of the dog clutch 45 and the annular supporting part 65 for supporting the electromagnetic actuator 13 are formed integrally with the flange part 17, it is possible to remove wasteful walls of the differential casing 15, whereby its weight can be saved with a reduction in the number of thick-walled parts.

In the rear differential 1 where the parting part 19 of the differential casing 15 is positioned on one side of the through-holes 23 for the pinion shafts 25, 27 in opposition to flange part 17 in the axial direction, the meshing reactive force from the side gear 5 on the side of the flange part 17 is not transmitted to the bolts 21. Thus, with a reduced burden on the bolts 21, it is possible to reduce a diameter of each bolt 21, whereby it can be saved in manufacturing cost and weight.

In comparison with a conventional structure where the differential casing 15 is divided into casing pieces on the border of the through-holes 23 for the pinion shafts 25, 27, it is possible to shorten the bolts 21, whereby both weight and cost of the bolts 21 can be further reduced with a reduced length of each bolt 21.

$2^{nd}$. Embodiment

Referring to FIGS. 4 to 7, we now explain a differential device in accordance with a second embodiment of the present invention. This differential device is embodied in the form of a rear differential 101 shown in FIGS. 4 to 7. In the following descriptions, "left direction" and "right direction" coincide with left and right directions in both a four-wheel drive vehicle provided with the rear differential 101 and FIG. 4, respectively. Note that elements functionally identical to those of the rear differential 1 of the first embodiment are indicated with the same reference numerals respectively. Although overlapping descriptions with the first embodiment are eliminated basically, the explanations of the first embodiment may be referred as occasion demands.

[Feature of the Rear Differential 101]

The rear differential 101 includes an input member rotated on receipt of the driving torque, four pinion gears 3 (as differential members, see FIG. 6) to which the driving torque is transmitted from the input member and a pair of side gears 5, 7 (as output gears in pairs) associated with the pinion gears 3 so as to be rotatable relatively to the pinion gears 3. The rear differential 1 further includes a differential mechanism 9 which is rotatable coaxially with the input member and an intermittent unit 103 for intermitting the drive torque. The intermittent unit 103 contains an electromagnetic actuator 13 for controlling an intermitting function of the unit 103. The above input member contains an outer differential casing 105 and an inner differential casing 107. The outer differential casing 105 contains a flange part 109 fixing a ring gear for inputting the driving torque. The flange part 109 is positioned on one side of the outer differential casing 105 in the axial direction of the rear differential 101 disproportionately (i.e. in so-called "offset" arrangement). The electromagnetic actuator 13 is arranged so as to abut on the flange part 109.

The outer differential casing 105 is divided into casing pieces on the border of a parting part 111 on one side of the casing 15 in opposition to the flange part 109 in the axial direction. These casing pieces are connected with each other into one body by bolts 21 (as connecting members).

The differential mechanism 9 includes one long pinion shaft 25 and two short pinion shafts 27 all connected to the inner differential casing 107 through through-holes 113 (as connecting parts). The pinion gears 3 are supported by the pinion shafts 25, 27. In the outer differential casing 105, the parting part 111 is arranged on one side of the through-holes 23 in opposition to the flange part 109 in the axial direction.

[Constitution of Four-Wheel Drive Vehicle]

Assume, the above four-wheel drive vehicle is traveling under a four-wheel driving condition. Then, if connecting a two-wheel/four-wheel switching mechanism built in a transfer with the rear differential 101 (the intermittent unit 103), the driving torque of an engine is allocated to a torque on a front-wheel side and a torque on a rear-wheel side through the transfer. The torque on the front-wheel side is allocated to left and right front wheels through a front differential and front axles, while the torque on the rear-wheel side is allocated to left and right rear wheels through a propeller shaft, the rear differential 101 and rear axles.

On the other hand, when the coupling between the two-wheel/four-wheel switching mechanism and the rear differential 101 (the intermittent unit 103) is cancelled, the vehicle is brought into a two-wheel driving condition in front-wheel drive.

[Constitution of Rear Differential 1]

The rear differential 101 is accommodated in a differential carrier and formed by the differential mechanism 9, the intermittent unit 103, the outer differential casing 105, the inner differential casing 107 and so on. The intermittent unit 103 is formed by the electromagnetic actuator 13, a dog clutch 115, a return spring 47, a controller and so on.

Figure 5:
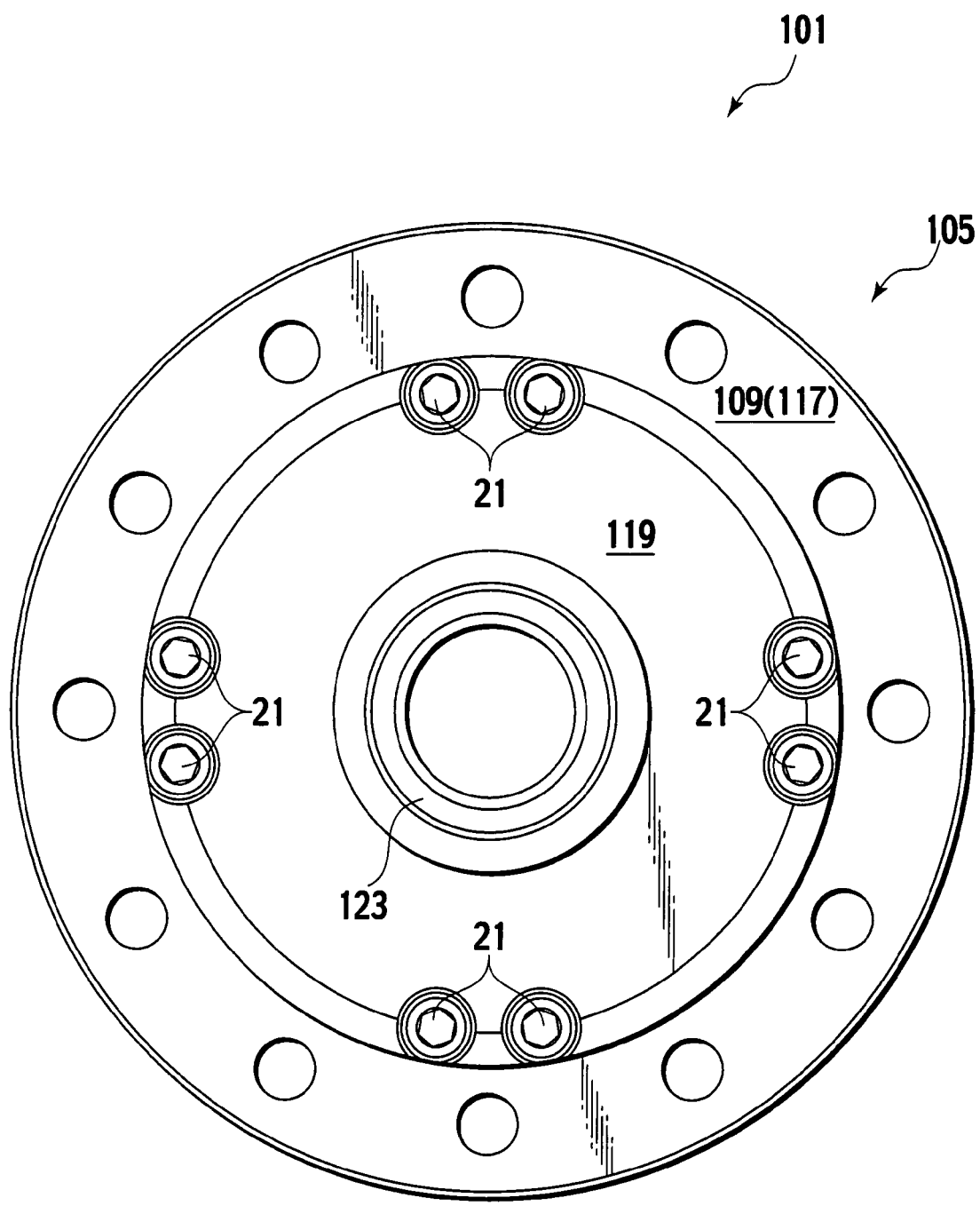
FIG. 5 is a view viewed from a direction shown with an arrow A of FIG. 4.
Figure 6:
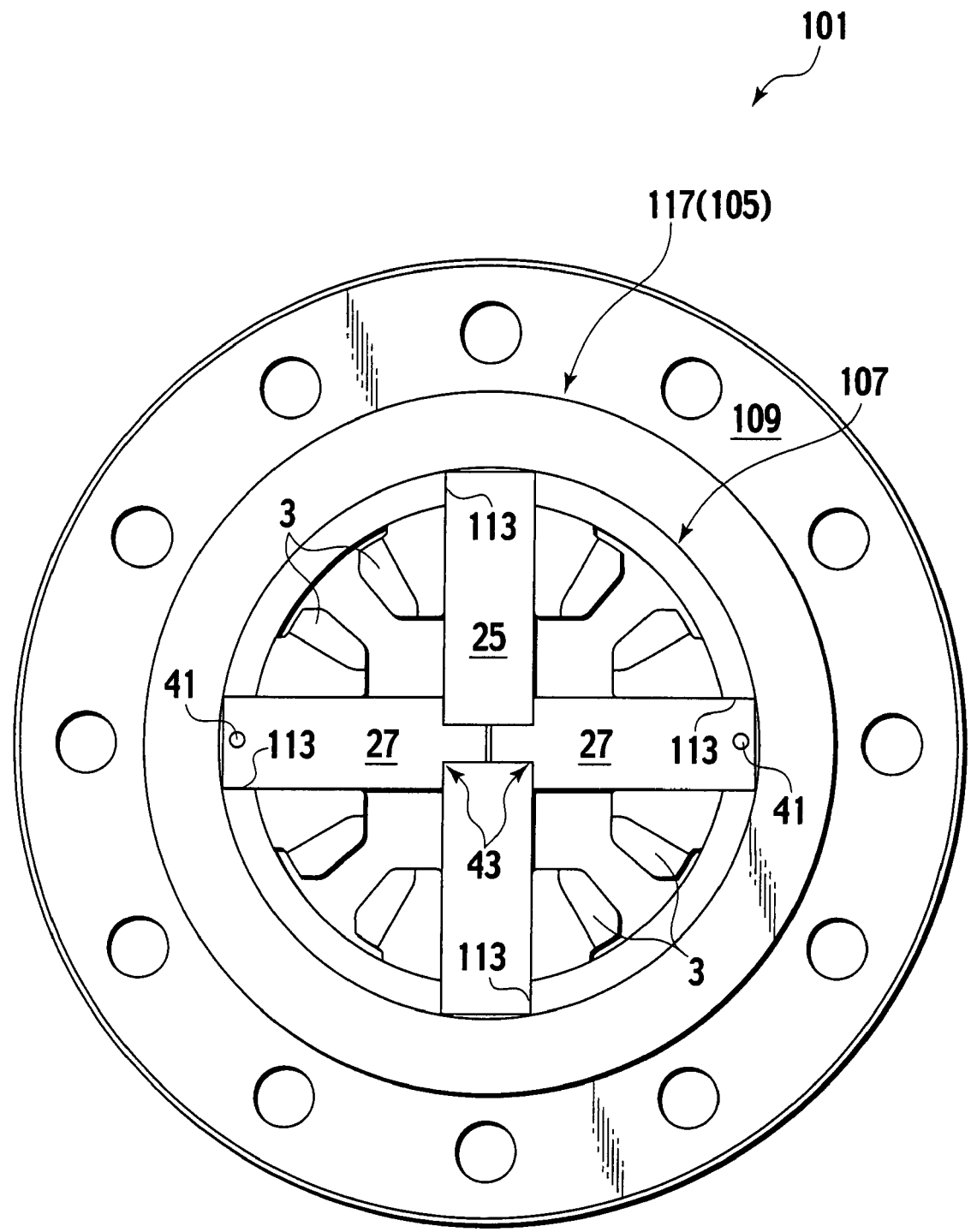
FIG. 6 is a sectional view taken along a line VI-VI of FIG. 4.

The outer differential casing 105 is divided into a differential casing body 117 and an end cover 119 on the border of the parting part 111. There casing pieces (the differential casing body 117, the end cover 119) are engaged with each other through a counter-lock type connecting part 116 provided in the parting part 111 to allow a centering of the casing pieces. Additionally, their casing pieces are fixed to each other by bolts 21. The bolts 21 are arranged in circumferential intervals between the pinion shaft 25 and the pinion shafts 27, two bolts for each interval and eight bolts in total, as shown in FIG. 5. The differential casing body 117 is formed with a boss part 121 supported by the differential carrier through a bearing. Similarly, the end cover 119 is formed with a boss part 123 supported by the differential carrier through a bearing. The flange part 109 is formed in the differential casing body 29. The ring gear is fixed on the flange part 17 by bolts (not shown). In this way, the outer differential casing 105 is rotated by the driving torque transmitted from an engine through the ring gear.

As shown in FIG. 3, the short pinion shafts 27, 27 are inserted into the through-holes 113 through their outer ends in the radial direction. The pinion shafts 27, 27 are prevented from dropping out of the through-holes 113 by spring pins 41. In the short pinion shafts 27, 27, their inner ends in the radial direction are connected to the long pinion shaft 25 by a joint part 43. Respective outer ends of the long pinion shaft 25 in the radial direction are inserted into the through-holes 113. The pinion shaft 25 is prevented from dropping out of the through-hoes 113 by the connected pinion shafts 27, 27.

Figure 4:
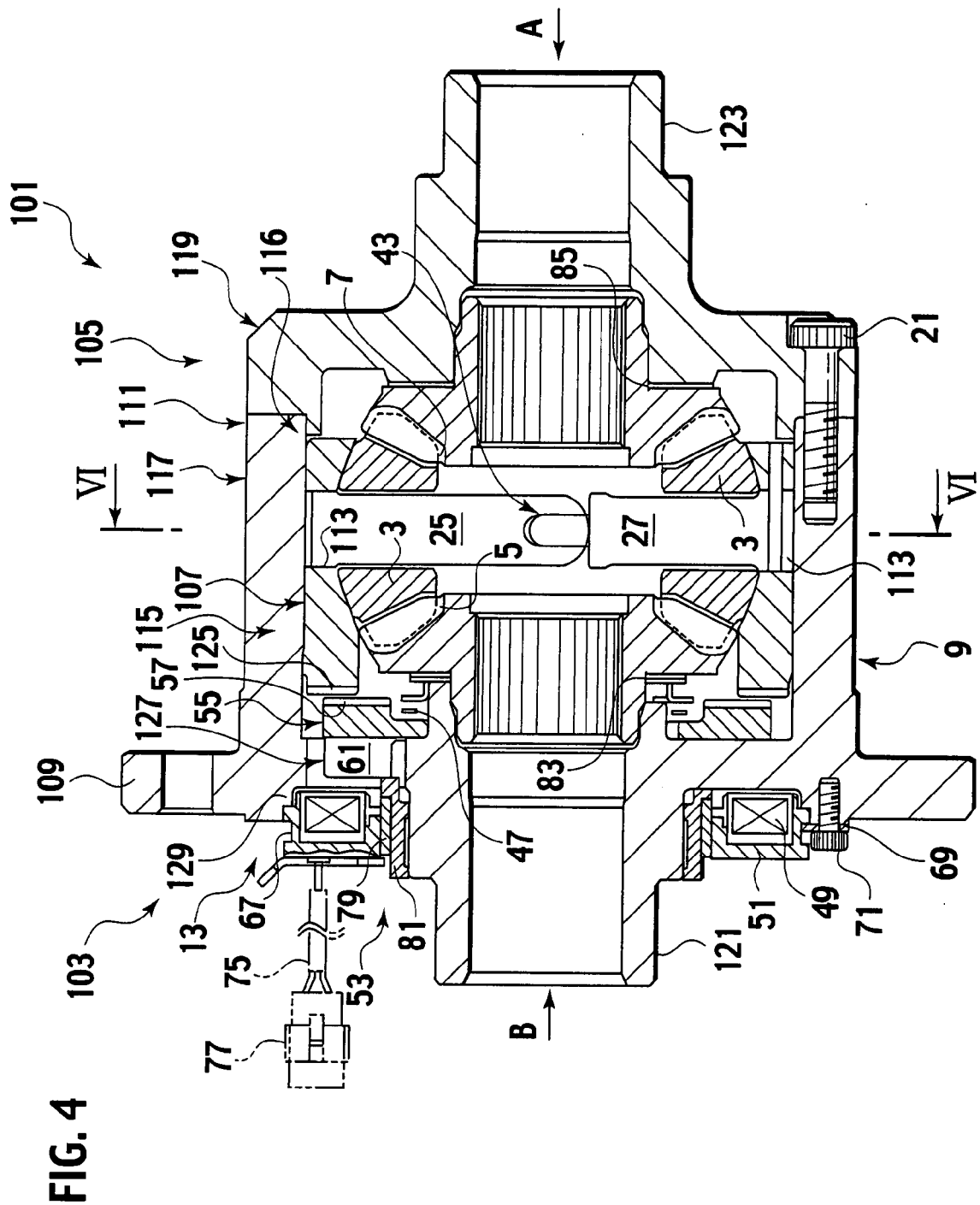
FIG. 4 is a sectional view showing a rear differential in accordance with a second embodiment of the present invention.

The dog clutch 115 is composed of a meshing gear 57 on a clutch ring 55 and a meshing gear 125 formed on the left end of the inner differential casing 107. These meshing gears 57, 125 are arranged so as to oppose each other in the axial direction of the rear differential 101. The clutch ring 55 is carried on the left boss part 121 of the outer differential casing 105 so as to be movable in the axial direction. In the clutch ring 55, its leg part 61 is engaged in a through-hole 127 of the outer differential casing 105, preventing the clutch ring 55 from rotating. When the clutch ring 55 moves to the right, the dog clutch 115 is brought into its engagement state. When the clutch ring 55 moves to the left as shown in FIG. 4, the engagement of the dog clutch 115 is cancelled. The return spring 47 is arranged between the side gear 5 and the clutch ring 55 to urge the clutch ring 55 in a direction to cancel the engagement of the dog clutch 115 (to the left).

In the electromagnetic solenoid 49, the coil housing 51 is supported by an annular supporting part 129 of the outer differential casing 105 in the radial direction. The coil housing 51 is provided, on its outer circumferential part, with a circumferential groove 67 in which a plate 69 is engaged. The plate 69 is fixed to the differential casing 105 by a bolt 71, making it impossible for the coil housing 51 to move relatively to the plate 69 in the axial direction.

Figure 7:
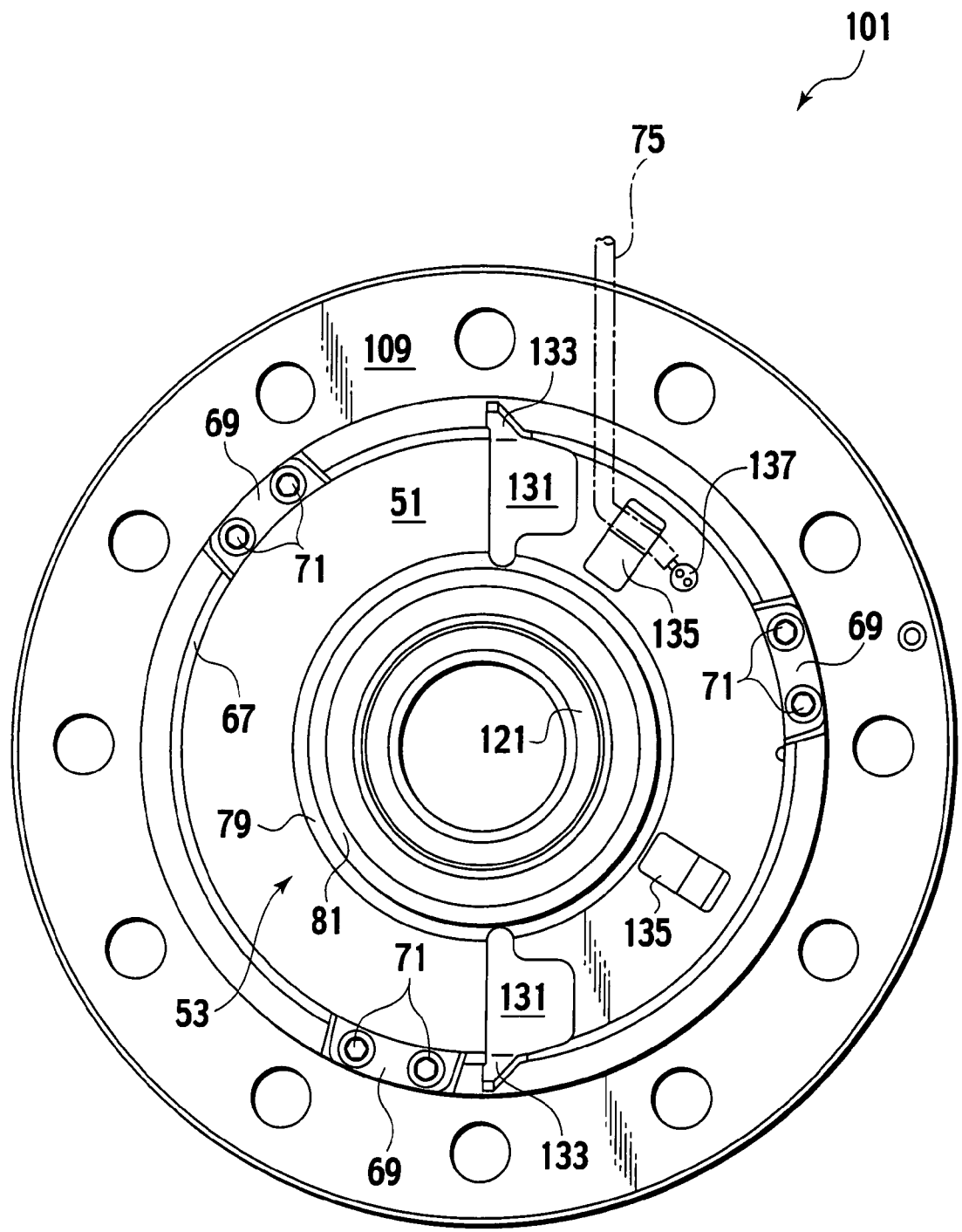
FIG. 7 is a view viewed from a direction shown with an arrow B of FIG. 4.

As shown in FIG. 7, two whirl-stop members 131 are fixed to the coil housing 51 at two positions. In each of the whirl-stop members 73, its leading end 133 is engaged with the differential carrier, preventing the coil housing 51 from rotating. Additionally, clips 135 are fixed on the coil housing 51.

The electromagnetic solenoid 49 has a lead wire 75 extracted from the coil housing 51 through a rubber seal plug 137. The so-extracted lead wire 75 is fixed on the coil housing 51 by the clips 137 (one clip used in the figure). The lead wire 75 is further extracted outside the differential carrier through the intermediary of a connector 77 and connected to a battery (not shown).

When the electromagnetic solenoid 49 is excited, the plunger 53 is moved to the right and the clutch ring 55 is pressed to activate the dog clutch 115 in engagement. As a result, the intermittent unit 103 is activated for connection to bring the vehicle into a four-wheel drive condition. When the excitation of the electromagnetic solenoid 49 is stopped, the plunger 53 returns to the left by the return spring 47, so that the engagement at the dog clutch 129 (connection at the intermittent unit 103) is canceled to bring the vehicle into a two-wheel drive condition of front-wheel drive.

In assembling of the rear differential 1, it is firstly performed to assemble a sub-assembly where the clutch ring 55, the return spring 47, the thrust washer 83, the left side gear 5, the inner differential casing 107 incorporating the pinion shafts 25, 27 and the pinion gears 3, and the electromagnetic actuator 13 (the electromagnetic solenoid 49, the coil housing 51, the plunger 53) are built into the differential casing body 117. Next, the right side gear 7 and the thrust washer 85 are assembled into the above sub-assembly and successively, the end cover 119 is fixed to the differential casing body 117 by the bolts 21. In this way, the rear differential 101 is completed.

[Effect of Rear Differential 101]

The rear differential 101 constructed in the above way has the following effects.

As the outer differential casing 105 is divided into the differential casing body 117 and the end cover 119 on the border of the parting part 111 on one side of the outer differential casing 105 in opposition to the flange part 109 in the axial direction of the rear differential 101, there can be prevented the following undesirable tendencies: thin-walled formation of the flange part 109 accompanied with the division of the outer differential casing 105 on the border of the flange part 109; and increasing in both size and weight of the outer differential casing 105 accompanied with a thick-walled flange part 109 in view of improving the strength.

Additionally, as the flange part 109 is not formed with a thick-walled structure, a layout to arrange the electromagnetic actuator 13 in the vicinity of the flange part 109 can be established with ease. Further, with the above arrangement of the electromagnetic actuator 13, it becomes easy to allow intervals between the boss parts 121, 123 of the differential casing 105 and the axial centers of the pinion shafts 25, 27 to correspond to required dimensions of the output shafts (drive shafts) on the side of the side gears 5, 7, whereby the layout capability in the circumference of the rear differential 101 and its mounting capability on a vehicle can be improved together.

Again, since the electromagnetic actuator 13 is arranged so as to abut on the flange part 109 of the outer differential casing 15, the dog clutch 115 forming the intermittent unit 103 can be arranged in the vicinity of the flange part 109. Correspondingly, as the through-hole 127 for receiving a part of the dog clutch 115 and the annular supporting part 129 for supporting the electromagnetic actuator 13 are formed integrally with the flange part 109, it is possible to remove wasteful walls of the differential casing 105, whereby its weight can be saved with a reduction in the number of thick-walled parts.

In comparison with a conventional structure where the differential casing 105 is divided into casing pieces on the border of the through-holes 113 for the pinion shafts 25, 27, it is possible to shorten the bolts 21, whereby both weight and cost of the bolts 21 can be further reduced with a reduced length of each bolt 21.

$3^{rd}$. Embodiment

Figure 8:
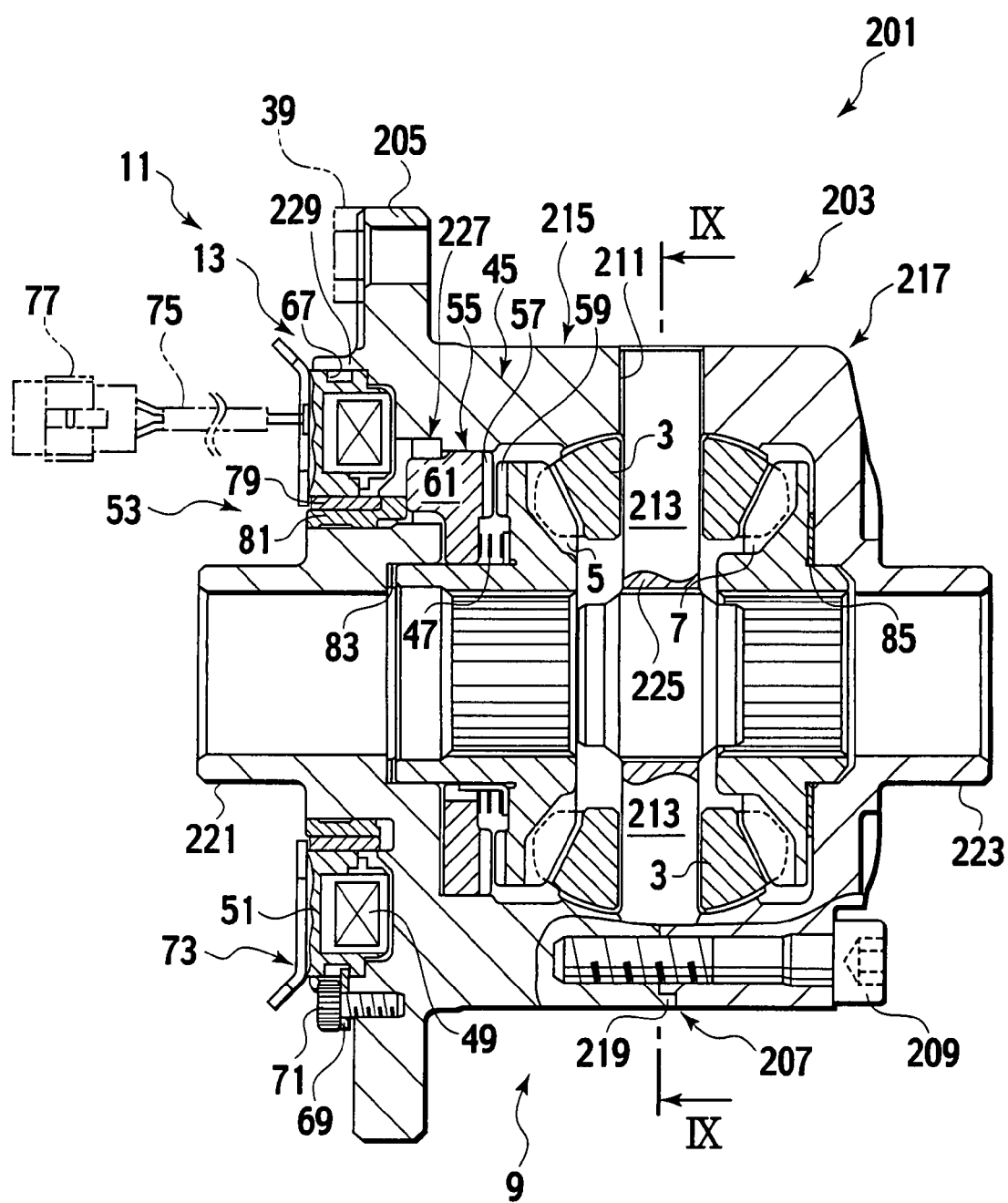
FIG. 8 is a sectional view showing a rear differential in accordance with a third embodiment of the present invention.
Figure 9:
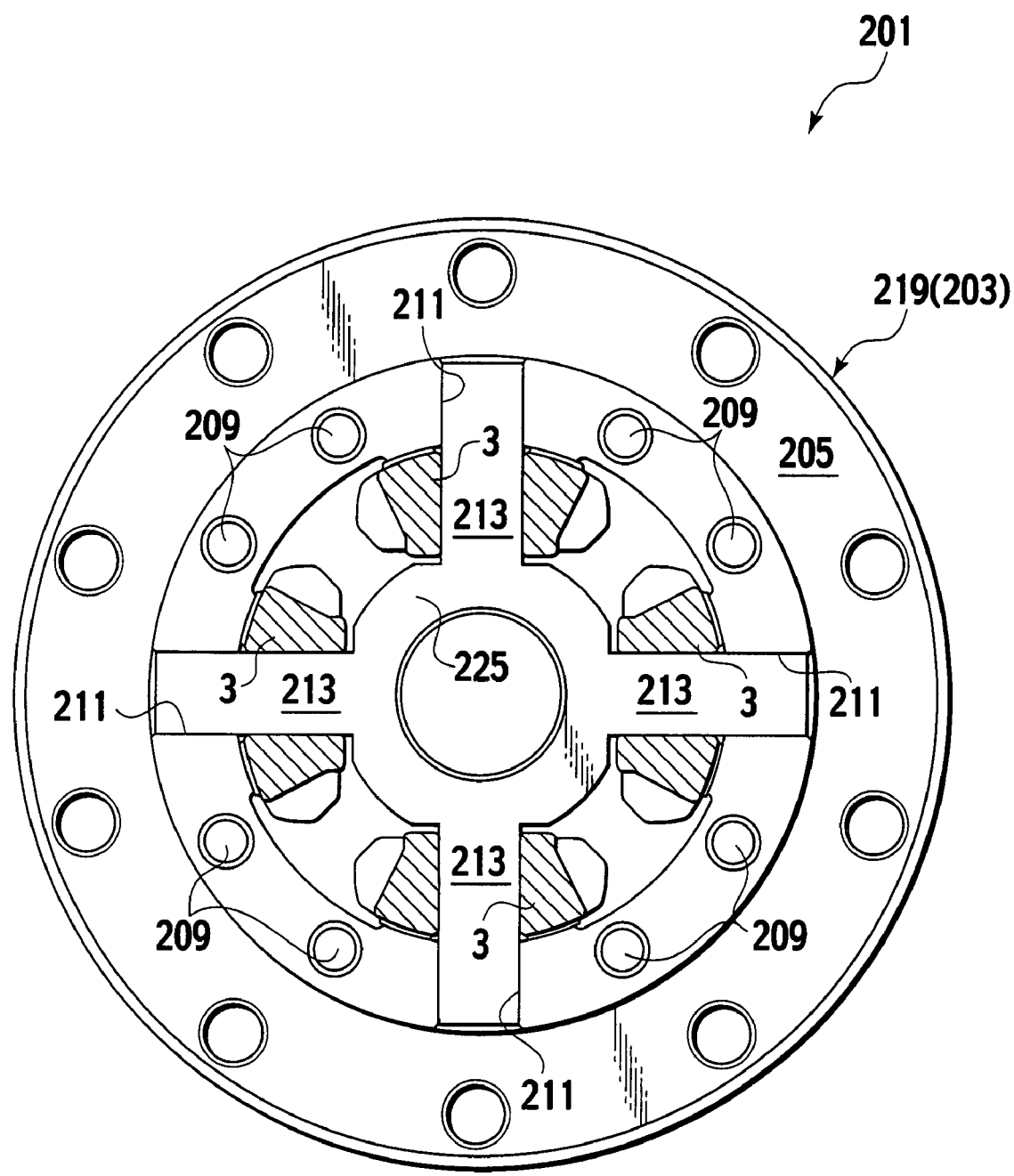
FIG. 9 is a sectional view taken along a line IX-IX of FIG. 8.

Referring to FIGS. 8 and 9, we now explain a differential device in accordance with a third embodiment of the present invention. This differential device is embodied in the form of a rear differential 201 shown in FIGS. 8 and 9. In the following descriptions, "left direction" and "right direction" coincide with left and right directions in both a four-wheel drive vehicle provided with the rear differential 201 and FIG. 8, respectively. Note that elements functionally identical to those of the rear differential 1 of the first embodiment are indicated with the same reference numerals respectively. Although overlapping descriptions with the first embodiment are eliminated basically, the explanations of the first embodiment may be referred as occasion demands.

[Feature of the Rear Differential 201]

The rear differential 101 includes an input member rotated on receipt of the driving torque, four pinion gears 3 (as differential members, see FIG. 9) to which the driving torque is transmitted from the input member and a pair of side gears 5, 7 (as output gears in pairs) associated with the pinion gears 3 so as to be rotatable relatively to the pinion gears 3. The rear differential 1 further includes a differential mechanism 9 which is rotatable coaxially with the input member and a differential locking unit 11 (as a limited-slip differential) for limiting a differential rotation of the differential mechanism 9. The differential locking unit 11 contains an electromagnetic actuator 13 for controlling a slip limiting force. The input member contains a differential casing 203 for accommodating the differential mechanism 9. The differential casing 203 contains a flange part 205 fixing a ring gear for inputting the driving torque. The flange part 205 is positioned on one side of the differential casing 203 in the axial direction of the rear differential 201 disproportionately (i.e. in so-called "offset" arrangement). The electromagnetic actuator 13 is arranged so as to abut on the flange part 205.

The differential casing 203 is divided into casing pieces on the border of a parting part 207 on one side of the casing 203 in opposition to the flange part 205 in the axial direction. These casing pieces are connected with each other into one body by bolts 209 (as connecting members). The differential mechanism 9 includes four pinion shafts 213 (shaft portions, see FIG. 9) all connected to the differential casing 203 through through-holes 211 (as connecting parts). The pinion gears 3 are supported by the pinion shafts 213. In the differential casing 203, the parting part 207 is arranged so as to separate each of the through-holes 211 into two hole portions.

[Constitution of Rear Differential 201]

The rear differential 201 is accommodated in a differential carrier and formed by the differential mechanism 9, the differential locking unit 11, the differential casing 203 and so on. The differential locking unit 11 is formed by the electromagnetic actuator 13, a dog clutch 45, a return spring 47, a controller and so on. The electromagnetic actuator 13 includes an electromagnetic solenoid 49, a coil housing 51 and a plunger 53.

The differential casing 203 is divided into a differential casing body 215 and an end cover 217 on the border of the parting part 207. There casing pieces (the differential casing body 215, the end cover 217) are engaged with each other through a counter-lock type connecting part 219 provided in the parting part 207 to allow a centering of the casing pieces.

Additionally, their casing pieces are fixed to each other by a plurality of bolts 209. As shown in FIG. 9, the bolts 209 are arranged in circumferential intervals between the adjoining pinion shaft 213, two bolts for each interval and eight bolts in total. The differential casing body 215 is formed with a boss part 221 supported by the differential carrier through a bearing. Similarly, the end cover 217 is formed with a boss part 223 supported by the differential carrier through a bearing. The flange part 205 is formed in the differential casing body 215. The ring gear is fixed on the flange part 205 by bolts 39.

As shown in FIG. 9, the respective pinion shafts 213 have their inner ends (in the radial direction) connected with each other through a hollow base part 225, providing a cross-shaped single component. In this component, respective inner ends of the pinion shafts (portions) 213 in the radial direction are inserted into the through-holes 211 respectively, preventing the component from dropping out of the differential casing 201.

Meanwhile, in the present invention, there can be adopted a radial-shaped pinion shaft (e.g. a pinion shaft having three shaft radially extended from the hollow base part 225 with 120-degree) instead of the above-described pinion shafts 213.

In the dog clutch 45, the clutch ring 55 is carried inside the differential casing 203 (the differential casing body 215) so as to movable in the axial direction. In the clutch ring 55, its leg part 61 is engaged in a through-hole 227 of the differential casing 203, preventing the clutch ring 55 from rotating. When the clutch ring 55 moves to the right, the dog clutch 45 is brought into its engagement state. When the clutch ring 55 moves to the left as shown in FIG. 8, the engagement of the dog clutch 45 is cancelled. In the plunger 53, the guide member 81 is supported so as to be movable in the axial direction on the outer circumference of the left boss part 221. In the guide member 81, its leasing end is capable of pushing the leg part 61 of the clutch ring 55 through the through-hole 227.

In the electromagnetic solenoid 49, the coil housing 51 is supported by an annular supporting part 229 of the differential casing 203 in the radial direction. The coil housing 51 is provided, on its outer circumferential part, with a circumferential groove 67 in which a plate 69 is engaged. The plate 69 is fixed to the differential casing 203 by a bolt 71, making it impossible for the coil housing 51 to move relatively to the plate 69 in the axial direction. When the electromagnetic solenoid 49 is excited, the plunger 53 is moved to the right to activate the dog clutch 45 in engagement, so that a differential motion of the differential mechanism 9 (the rear differential 201) is locked on. When the excitation of the electromagnetic solenoid 49 is stopped, the plunger 53 returns to the left by the return spring 47, so that the engagement at the dog clutch 45 and the locked differential motion are cancelled.

While the differential mechanism 9 is transmitting the driving torque, a gearing clutch action (dog clutch) is produced between each of the side gears 5, 7 and each of the pinion gears 3. As a result, a meshing reactive force of the left side gear 5 is transmitted to the differential casing body 215 through a thrust washer 83, while a meshing reactive force of the right side gear 7 is transmitted to the end cover 217 through a thrust washer 85.

In assembling, it is firstly performed to assemble a sub-assembly where the clutch ring 55, the return spring 47, the thrust washer 83, the left side gear 5 and the electromagnetic actuator 13 (the electromagnetic solenoid 49, the coil housing 51, the plunger 53) are built into the differential casing body 215. Next, a pinion shaft assembly having four pinion shafts 213 formed integrally with each other, the pinion gears 3 fitted on the pinion shaft assembly, the right side gear 7 and the thrust washer 85 are assembled between the above sub-assembly and the end cover 31. In succession, the end cover 31 is fixed to the differential casing body 215 by the bolts 209. In this way, the rear differential 201 is completed.

[Effect of Rear Differential 201]

The rear differential 201 constructed in the above way has the following effects.

As the differential casing 203 is divided into the differential casing body 215 and the end cover 217 on the border of the parting part 207 on one side of the differential casing 203 in opposition to the flange part 205 in the axial direction of the rear differential 201, there can be prevented the following undesirable tendencies: thin-walled formation of the flange part 205 accompanied with the division of the differential casing 203 on the border of the flange part 205; and increasing in both size and weight of the differential casing 203 accompanied with a thick-walled flange part 205 in view of improving the strength.

Additionally, as the flange part 205 is not formed with a thick-walled structure, a layout to arrange the electromagnetic actuator 13 in the vicinity of the flange part 205 can be established with ease. Further, with the above arrangement of the electromagnetic actuator 13, it becomes easy to allow intervals between the boss parts 221, 223 of the differential casing 203 and the axial centers of the pinion shafts 213 to correspond to required dimensions of the output shafts (drive shafts) on the side of the side gears 5, 7, whereby the layout capability in the circumference of the rear differential 201 and its mounting capability on a vehicle can be improved together.

Again, since the electromagnetic actuator 13 is arranged so as to abut on the flange part 205 of the differential casing 203, the dog clutch 45 forming the differential locking unit 11 can be arranged in the vicinity of the flange part 205. Correspondingly, as the through-hole 63 for receiving a part of the dog clutch 45 and the annular supporting part 65 for supporting the electromagnetic actuator 13 are formed integrally with the flange part 17, it is possible to remove wasteful walls of the differential casing 15, whereby its weight can be saved with a reduction in the number of thick-walled parts.

Here, it is noted that the above-mentioned one-piece pinion shaft structure where four pinion shafts (portions) 213 are formed so as to extend from the base part 225 in the radial direction integrally cannot be assembled in the differential casing 203 unless it is divided on the border of the through-holes 211 for the pinion shafts 213. However, according to the structure of this embodiment where the parting part 207 of the differential casing 203 is positioned in the through-holes 211 (i.e. partition at the center of each through-hole 211), the assembling of the above one-piece pinion shaft structure is accomplished with ease. Additionally, since the degrees of freedom in terms of the number of pinion shafts 213 (four), the shape of pinion-shaft structure (cross shape) and the number of pinion gears 3 (four) are increased respectively, it is possible to allow the rear differential 201 to cope with a requirement of transmitting great torque with the use of four pinion gears 3.

Furthermore, with the structure where the differential casing 203 is divided on the border of the through-holes 211, it is possible to facilitate not only assembling of the pinion shafts 213 and the pinion gears 3 but assembling of the side gears 5, 7.

$4^{th}$. Embodiment

Figure 10:
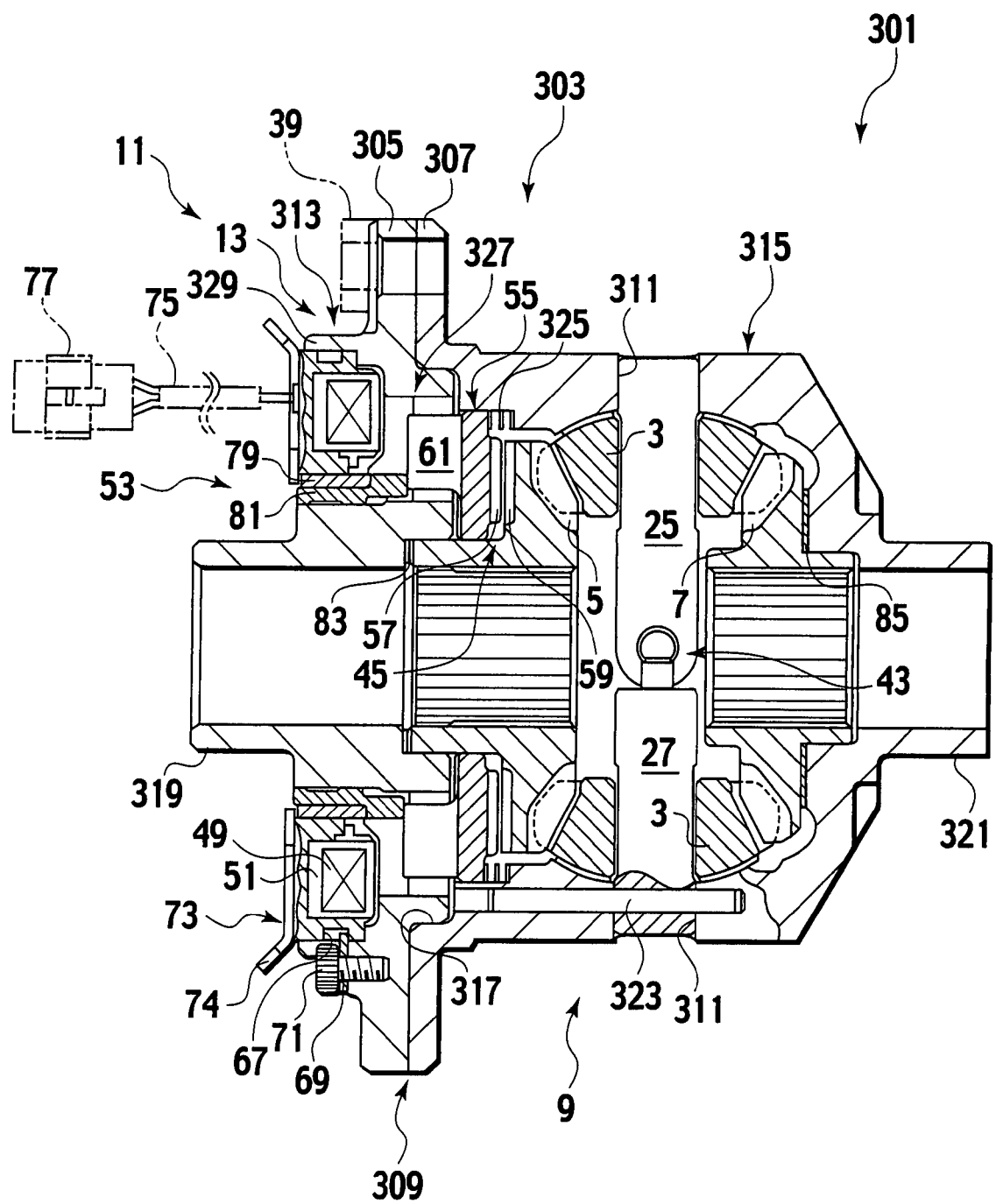
FIG. 10 is a sectional view showing a rear differential in accordance with a fourth embodiment of the present invention.

Referring to FIG. 10, we now explain a differential device in accordance with a fourth embodiment of the present invention. This differential device is embodied in the form of a rear differential 301 shown in FIG. 10. In the following descriptions, "left direction" and "right direction" coincide with left and right directions in both a four-wheel drive vehicle provided with the rear differential 201 and FIG. 10, respectively.

[Feature of the Rear Differential 301]

The rear differential 301 includes an input member rotated on receipt of the driving torque, four pinion gears 3 (as differential members) to which the driving torque is transmitted from the input member and a pair of side gears 5, 7 (as output gears in pairs) associated with the pinion gears 3 so as to be rotatable relatively to the pinion gears 3. The rear differential 301 further includes a differential mechanism 9 which is rotatable coaxially with the input member and a differential locking unit 11 (as a limited-slip differential) for limiting a differential rotation of the differential mechanism 9. The differential locking unit 11 contains an electromagnetic actuator 13 for controlling a slip limiting force. The input member contains a differential casing 303 for accommodating the differential mechanism 9. The differential casing 303 contains flange parts 305, 307 fixing a ring gear for inputting the driving torque. The flange parts 305, 307 are positioned on one side of the differential casing 203 in the axial direction of the rear differential 301 disproportionately (i.e. in so-called "offset" arrangement). The electromagnetic actuator 13 is arranged so as to abut on the flange parts 305, 307.

The differential casing 303 is divided into casing pieces on the border of a parting part 309 provided in the flange parts 305, 307. These casing pieces are connected with each other into one body by bolts 39 (as connecting members). The differential mechanism 9 includes one long pinion shaft 25 and two short pinion shafts 27 all connected to the differential casing 303 through through-holes 311 (as connecting parts). The pinion gears 3 are supported by the pinion shafts 25, 27.

[Constitution of Four-Wheel Drive Vehicle]

Assume, the above four-wheel drive vehicle is traveling under a four-wheel driving condition. Then, when the rear differential 301 is coupled to a two-wheel/four-wheel switching mechanism built in a transfer, the driving torque of an engine is allocated to a torque on a front-wheel side and a torque on a rear-wheel side through the transfer. The torque on the front-wheel side is allocated to left and right front wheels through a front differential, while the torque on the rear-wheel side is allocated to left and right rear wheels through a propeller shaft and the rear differential 301.

On the other hand, when the coupling state between the rear differential 301 and the two-wheel/four-wheel switching mechanism is cancelled, the vehicle is brought into a two-wheel driving condition.

[Constitution of Rear Differential 301]

The rear differential 301 is accommodated in a differential carrier and formed by the differential mechanism 9, the differential locking unit 11, the differential casing 303 and so on.

The differential casing 303 is divided into a front cover 313 and a differential casing body 315 on the border of the parting part 309. There casing pieces (the front cover 313, the differential casing body 315) are engaged with each other through a counter-lock type connecting part 317 to allow a centering of the casing pieces. Additionally, there casing pieces are fixed to each other by the bolts 39. The front cover 313 is formed with a boss part 319 supported by the differential carrier through a bearing. Similarly, the differential casing body 315 is formed with a boss part 321 supported by the differential carrier through a bearing. The flange parts 305, 307 are formed in the front cover 313 and the differential casing body 315, respectively. The ring gear is fixed on the flange parts 305, 307 by the bolts 39 commonly.

In the differential mechanism 9, the side gears 5, 7 meshes with each pinion gear 3, on both sides of the gear 3. These side gears 5, 7 are connected to left and right rear wheels through output shafts (not shown). The output shafts are spline-connected to the side gears 5, 7, respectively. The short pinion shafts 27, 27 are inserted into the through-holes 311 through their outer ends in the radial direction. The pinion shafts 27, 27 are prevented from dropping out of the through-holes 311 by spring pins 323. In the short pinion shafts 27, 27, their inner ends in the radial direction are connected to the long pinion shaft 25 by a joint part 43. Respective outer ends of the pinion shaft 25 in the radial direction are inserted into the through-holes 311. The pinion shaft 25 is prevented from dropping out of the through-hoes 311 by the connected pinion shafts 27, 27.

The differential locking unit 11 comprises the electromagnetic actuator 13, a dog clutch 45, a return spring 325, a controller and so on. The electromagnetic actuator 15 includes an electromagnetic solenoid 49, a coil housing 51 containing the electromagnetic solenoid 49 and a plunger 53.

The dog clutch 45 has meshing gears 57, 59 respectively formed on a clutch ring 55 and the left side gear 5 to oppose each other in the axial direction. The clutch ring 55 is arranged on one side of the electromagnetic actuator 13. Inside the differential casing 303 (the front cover 313), the clutch ring 55 is carried so as to movable in the axial direction. In the clutch ring 55, its leg part 61 is engaged in a through-hole 327 of the differential casing 303, preventing the clutch ring 55 from rotating. When the clutch ring 55 moves to the right, the dog clutch 45 is brought into its engagement state. When the clutch ring 55 moves to the left as shown in FIG. 10, the engagement of the dog clutch 45 is cancelled. The return spring 325 is arranged between the side gear 5 (the meshing gear 59) and the clutch ring 55 (the meshing gear 57) to urge the clutch ring 55 in a direction to cancel the engagement of the dog clutch 45 (to the left).

In the electromagnetic solenoid 49, the coil housing 51 is supported by an annular supporting part 329 of the differential casing 303 in the radial direction. The coil housing 51 is provided, on its outer circumferential part, with a circumferential groove 67 in which a plate 69 is engaged. The plate 69 is fixed to the differential casing 303 (the front cover 313) by a bolt 71, making it impossible for the coil housing 51 to move relatively to the plate 69 in the axial direction. A whirl-stop member 73 is fixed to the coil housing 51. In the whirl-stop member 73, its leading end 74 is engaged with the differential carrier, preventing the coil housing 51 from rotating. The electromagnetic solenoid 49 has a lead wire 75 extracted from the coil housing 51 through a rubber seal plug. The so-extracted lead wire 75 is fixed on a side wall of the coil housing 51 by means of clips. The lead wire 75 is further extracted outside the differential carrier through the intermediary of a connector 77 and connected to a battery (not shown).

The plunger 53 is formed by a plunger body 79 made of magnetic material, such as JIS-S10C, and a guide member 81 made of non-magnetic material, such as stainless steel, and also fixed to the inner circumference of the plunger body 79. On the outer circumference of the left boss part 319 (the front cover 313), the guide member 81 is supported so as to be movable in the axial direction. In the guide member 81, its leasing end is capable of pushing the leg part 61 of the clutch ring 55 through the through-hole 327.

The coil housing 51 made of magnetic material (e.g. JIS-S10C), the plunger 53 and the differential casing 303 constitute a magnetic path of the electromagnetic solenoid 49. The controller has charge of both excitation and non-excitation of the electromagnetic solenoid 49. When the electromagnetic solenoid 49 is excited, the plunger 53 is moved to the right and the clutch ring 55 is pressed to activate the dog clutch 45 in engagement, so that a differential motion of the differential mechanism 9 (the rear differential 301) is locked on. When the excitation of the electromagnetic solenoid 49 is stopped, the plunger 53 returns to the left by the return spring 325, so that the engagement at the dog clutch 45 and the locked differential motion are cancelled, as shown in FIG. 10. The non-magnetic guide member 81 prevents magnetic flux of the electromagnetic solenoid 49 from leaking out toward the differential casing 303. As mentioned before, the coil housing 51 of the electromagnetic solenoid 49 abuts on the supporting part 329 of the differential casing 303 in the radial direction of the rear differential 301, while the coil housing 51 is supported by the plate 69 and the bolt 71 in the axial direction of the rear differential 301. Therefore, with the stable supporting form, there is little fluctuation in flux transmitted through the differential casing 303, so that the operational function of the dog clutch 45 can be stabilized.

While the differential mechanism 9 is transmitting the driving torque, a gearing clutch action (dog clutch) is produced between each of the side gears 5, 7 and each of the pinion gears 3. As a result, a meshing reactive force of the left side gear 5 is transmitted to the front cover 313 through a thrust washer 83, while a meshing reactive force of the right side gear 7 is transmitted to the differential casing body 313 through a thrust washer 85. Only the meshing reactive force of the right side gear 5 is applied on the bolts 39 fixing the front cover 313 with the differential casing body 315. Note that the bolts 39 (ten bolts) are arranged at regular intervals in the circumferential direction of the front cover 313.

In assembling of the rear differential 301, it is firstly performed to prepare the differential casing body 315 where the thrust washer 85, the right side gear 7, the pinion shafts 25, 27, the pinion gears 3, the left side gear 5, the return spring 325 and the clutch ring 55 are built in and the front cover 313 where the electromagnetic actuator 13 (the electromagnetic solenoid 49, the coil housing 51, the plunger 53) and the thrust washer 83 are built in. Then, the so-prepared differential casing body 315 and the front cover 313 are engaged with each other so that the flange part 307 abuts on the flange part 305 and successively, the differential casing body 315 is fixed to the front cover 313 by the bolts 39. In this way, the rear differential 301 is completed.

[Effect of Rear Differential 301]

The rear differential 301 constructed in the above way has the following effects.

Since the electromagnetic actuator 13 is arranged in the vicinity of the flange parts 305, 307 of the differential casing 303, it becomes easy to allow intervals between the boss parts 319, 321 of the differential casing 303 and the axial centers of the pinion shafts 25, 27 to correspond to required dimensions of the output shafts (drive shafts) on the side of the side gears 5, 7, whereby the layout capability in the circumference of the rear differential 301 and its mounting capability on a vehicle can be improved together.

Again, since the electromagnetic actuator 13 is arranged so as to adjoin the flange parts 305, 307 of the differential casing 303, the dog clutch 45 forming the differential locking unit 11 can be arranged in the vicinity of the flange parts 305, 307. Correspondingly, as the through-hole 327 for receiving a part of the dog clutch 45 and the annular supporting part 329 for supporting the electromagnetic actuator 13 are formed in the front cover 313, it is possible to remove wasteful walls of the differential casing 303, whereby its weight can be saved with a reduction in the number of thick-walled parts.

Other Embodiments of the Invention

In the differential device of the present invention, the limited-slip differential is not limited to one for locking a differential motion but may be a limited-slip differential for controlling a limited-slip differential force by a friction clutch.

Besides a rear differential, the differential device of the present invention may be applied to a front differential (i.e. a differential device for allocating the driving torque of a motor to left and right front wheels) or a center differential (i.e. a differential device for allocating the driving torque of a motor to front and rear wheels).

In the present invention, the connecting members are not limited to the bolts disclosed in the above embodiments. In the device's welding area having a reduced bulge space to the outside and producing no issue of interference, for instance, the connecting members (connecting means in a broad sense) may be provided by the combination of a screw engagement, which is characterized by smallness in the number of parts and easiness for assembling, with any one of spot-welding, caulking and lock nut.

Finally, it will be understood by those skilled in the art that the foregoing descriptions are nothing but embodiments and various modifications of the disclosed differential device and therefore, various changes and modifications may be made within the scope of claims.

Although the present invention has been described above by reference to certain embodiments of the invention, the invention is not limited to the embodiments described above and modifications will occur to those skilled in the art, in light of the teachings. The scope of the invention is defined with reference to the following claims.

This application is based upon the Japanese Patent Application No. 2006-187232, filed on Jul. 6, 2006, the entire content of which is incorporated by reference herein.

What is claimed is:

1. A differential device for a vehicle, comprising:

a differential mechanism including an input member which is rotatable by a driving torque inputted, differential members to which the driving torque is transmitted from the input member, a pair of output members connected to the differential members so as to be rotatable relatively to the differential members, wherein the differential mechanism being rotatable coaxially with the input member; and either a limited-slip differential for limiting a differential rotation of the differential mechanism or an intermittent unit for intermitting the driving torque, the limited-slip differential or the intermittent unit being arranged on either side of the differential members in an axial direction of the output members, wherein the limited-slip differential or the intermittent unit includes a clutch arranged adjacent to the differential members in an axial direction of the differential casing and an actuator arranged adjacent to the clutch in the axial direction of the differential casing to control a limited-slip differential force of the limited-slip differential or an intermittent function of the intermittent unit;

the input member includes a cylindrical differential casing accommodating the differential mechanism, the differential casing including a flange part to which a ring gear for inputting the driving torque is fixed, the flange part is positioned on one side of the differential casing in the axial direction of the differential casing;

the actuator includes an electromagnetic solenoid and a coil housing containing the electromagnetic solenoid;

the coil housing is arranged so as to abut on the flange part, and accommodated in an annular supporting part, which is depressed on an axial end of the differential casing; and the differential casing is divided into casing pieces by a parting part on another side of the differential in opposition to the flange part in the axial direction of the differential casing, the casing pieces being connected with each other by connecting members.

2. The differential device of claim 1, wherein
the differential mechanism includes at least one pinion shaft connected to the differential casing at a connecting part,
the differential members are supported by the pinion shaft, and
the parting part of the differential casing is arranged on one side of the connecting part in opposition to the flange part in the axial direction of the differential casing.

3. The differential device of claim 2, wherein
the connecting part has a plurality of through-holes formed in the differential casing, and
the pinion shaft has its both ends inserted into the through-holes.

4. The differential device of claim 2, wherein the differential casing comprises an outer differential casing and an inner differential casing arranged inside the outer differential casing, the connecting part has a plurality of through-holes formed in the inner differential casing, and the pinion shaft has its both ends inserted into the through-holes.

5. The differential device of claim 1, wherein the differential mechanism includes at least one pinion shaft connected to the differential casing at a connecting part, the differential members are supported by the pinion shaft, and the parting part of the differential casing is included in the connecting part.

6. The differential device of claim 5, wherein the connecting part has a plurality of through-holes formed in the differential casing, and the pinion shaft has its both ends inserted into the through-holes.

7. The differential device of claim 6, wherein the pinion shaft is radial-shaped.

8. The differential device of claim 1, wherein
the actuator is arranged so as to abut on the differential casing in both a radial direction and the axial direction of the differential casing.

9. The differential device of claim 1, wherein
the actuator includes a plunger.

10. The differential device of claim 1, wherein
the differential casing constitutes a part of a magnetic path generated by the electromagnetic solenoid.

* * * * *